United States Patent
Nanja

(10) Patent No.: US 7,770,034 B2
(45) Date of Patent: Aug. 3, 2010

(54) PERFORMANCE MONITORING BASED DYNAMIC VOLTAGE AND FREQUENCY SCALING

(75) Inventor: Murthi Nanja, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/736,728

(22) Filed: Dec. 16, 2003

(65) Prior Publication Data

US 2005/0132238 A1 Jun. 16, 2005

(51) Int. Cl.
G06F 1/32 (2006.01)

(52) U.S. Cl. .................................................. 713/300
(58) Field of Classification Search ................. 713/300
See application file for complete search history.

(56) References Cited

U.S. PATENT DOCUMENTS

| | | | |
|---|---|---|---|
| 4,601,008 A | 7/1986 | Kato | |
| 5,175,853 A | 12/1992 | Kardach et al. | |
| 5,291,604 A | 3/1994 | Kardach et al. | |
| 5,566,364 A | 10/1996 | Mizoguchi et al. | |
| 5,630,148 A | 5/1997 | Norris | |
| 5,682,417 A | 10/1997 | Nitta | |
| 5,719,800 A | 2/1998 | Mittal et al. | |
| 5,765,209 A | 6/1998 | Yetter | |
| 6,029,145 A | 2/2000 | Barritz et al. | |
| 6,170,083 B1 | 1/2001 | Adl-Tabatabai | |
| 6,205,555 B1* | 3/2001 | Kageshima et al. | 713/300 |
| 6,230,313 B1* | 5/2001 | Callahan et al. | 717/128 |
| 6,233,690 B1* | 5/2001 | Choi et al. | 713/322 |
| 6,357,016 B1* | 3/2002 | Rodgers et al. | 713/601 |
| 6,530,075 B1 | 3/2003 | Beadle et al. | |
| 6,684,390 B1 | 1/2004 | Goff | |
| 6,711,447 B1* | 3/2004 | Saeed | 700/82 |
| 6,762,629 B2 | 7/2004 | Tam et al. | |
| 7,013,456 B1 | 3/2006 | Van Dyke et al. | |
| 7,079,904 B1 | 7/2006 | Forstrom et al. | |
| 7,111,179 B1* | 9/2006 | Girson et al. | 713/300 |
| 7,134,031 B2* | 11/2006 | Flautner | 713/322 |

(Continued)

OTHER PUBLICATIONS

Pering et al., "Dynamic Voltage Scaling and the Design of a Low-Power Microprocessor System", University of California Berkeley, Electronics Research Laboratory, 6 pages (1998).

(Continued)

Primary Examiner—Thomas Lee
Assistant Examiner—Eric Chang
(74) Attorney, Agent, or Firm—Marshall, Gerstein & Borun LLP

(57) ABSTRACT

Voltage and frequency scaling techniques that are based upon monitored data are provided. The techniques may be used to better manage the power and energy consumption of a processor in an embedded system, such as a cellular telephone, personal data assistant, smart device, or the like. The techniques may be used with processors that offer a performance monitoring capability. The performance monitor may monitor thread-level utilization at runtime. Instructions per cycle and memory references per cycle are example metrics that may be monitored by the performance monitor. The voltage and frequency scaling techniques may adjust the operating voltage and operating frequency of the processor based on the values of these two metrics. For example, the techniques may include accessing a voltage and frequency scheduler lookup table. The techniques may be employed with non-embedded systems, as well, embedded systems.

21 Claims, 4 Drawing Sheets

U.S. PATENT DOCUMENTS

| | | | |
|---|---|---|---|
| 7,146,613 | B2 | 12/2006 | Chauvel et al. |
| 7,346,787 | B2 | 3/2008 | Vaidya et al. |
| 7,617,490 | B2 | 3/2009 | Murthi |
| 2002/0083110 | A1 | 6/2002 | Kozuch et al. |
| 2002/0100030 | A1 | 7/2002 | Souloglou et al. |
| 2002/0112227 | A1 | 8/2002 | Kramskoy et al. |
| 2003/0009705 | A1 | 1/2003 | Thelander et al. |
| 2003/0217248 | A1 | 11/2003 | Nohl et al. |
| 2004/0010785 | A1 | 1/2004 | Chauvel et al. |
| 2004/0044914 | A1 | 3/2004 | Gedeon |
| 2004/0123278 | A1 | 6/2004 | Nanja et al. |
| 2004/0158813 | A1 | 8/2004 | Xia et al. |
| 2004/0163003 | A1 | 8/2004 | Dutton et al. |
| 2004/0168028 | A1 | 8/2004 | Cierniak |
| 2005/0049729 | A1 | 3/2005 | Culbert et al. |
| 2005/0055677 | A1 | 3/2005 | Nanja et al. |
| 2005/0114850 | A1 | 5/2005 | Chheda et al. |
| 2005/0229149 | A1 | 10/2005 | Munter et al. |
| 2006/0123253 | A1 | 6/2006 | Morgan et al. |
| 2007/0180102 | A1 | 8/2007 | DeWitt et al. |
| 2007/0192641 | A1 | 8/2007 | Nagendra et al. |

OTHER PUBLICATIONS

Govil et al., "Comparing Algorithms for Dynamic Speed-Setting of a Low-Power CPU", Computer Science Division University of California, pp. 13-26 (1995).
Grunwald et al., "Policies for Dynamic Clock Scheduling", Department of Computer Science University of Colorado, 14 pages (2000).
Flinn et al., "Energy-aware Adaption for Mobile Applications," *School of Computer Science*, Carnegie Mellon University, pp. 1-16 (1999).
Flinn et al., "PowerScope: A Tool for Profiling the Energy Usage of Mobile Applications," *School of Computer Science*, Carnegie Mellon University, 9 pages (1999).
Chary et al., Power Management Technologies for WLAN enabled Handheld Devices, Intel Developer Forum Presentation (Fall 2003).
Tennies, Software Matters for Power Consumption, 7 pages (Jan. 22, 2003). Available at URL: http://www.embedded.com/story/OEG20030121S0057.
"ACPI Overview" (2000).
"How to Use the System Utility to Configure the PMU on Intel® PCA." Retrieved from the Internet on Dec. 6, 2004.
"Montavista® Linux® Consumer Electronics Edition 3.1" (2004).
"Performance Profiling Techniques on Intel® XScale™ Microarchitecture Processors: Application Note" (2002).
Chen et al., "Energy-Aware Compilation and Execution in Java-Enabled Mobile Devices," *IEEE*, p. 1-8 (2003).
Chinese Office Action for Application No. 200480025747.7, dated Nov. 9, 2007.
Clark, "Mobile Processors Begin to Grow Up," *Computer IEEE Computer Society USA*, 35(3):22-25 (2002).
Delsart et al., "JCOD: A Lightweight Modular Compilation Technology for Embedded Java," *Lecture Notes in Computer Science, Springer Verlag*, 2491:197-212 (2002).
Fischer et al., "Optimal Mixing of 16-bit and 32-bit Computer Codes by Means of 'Codebalance," *Electronik Weka-Fachzeitscriften* Germany, 48(19):96-99 (1999).
Halambi et al., "An Efficient Compiler Technique for Code Size Reduction using Reduced Bit-width ISAs," *Proceedings of the 2002 Design, Automation and Test in Europe Conference and Exhibition*, pp. 1-7 (2002).
International Preliminary Report on Patentability for Application No. PCT/US2004/029083, dated Mar. 23, 2006.
International Search Report for Application No. PCT/US2004/029083, dated Feb. 7, 2005.
Krishnaswamy et al., "Mixed-Width Instruction Sets," *Communications of the Association for Computing Machinery, Association for Computing Machinery*, 46(8):47-52 (2003).
Krishnaswamy et al., "Profile Guided Selection of ARM and Thumb Instructions," *Sigplan Notices ACM USA*, 37(7):56-64 (2002).
Lafond et al., "An Opcode Level Energy Consumption Model or a Java Virtual Machine," *Turku Centre for Computer Science*, pp. 1-2 (2004).
Office Action for U.S. Appl. No. 10/659,457, dated Dec. 13, 2007.
Office Action for U.S. Appl. No. 10/659,457, dated Dec. 31, 2008.
Office Action for U.S. Appl. No. 10/659,457, dated Jun. 11, 2008.
Office Action for U.S. Appl. No. 10/659,457, dated May 16, 2007.
Office Action for U.S. Appl. No. 10/659,457, dated Oct. 23, 2006.
Office Action for U.S. Appl. No. 10/802,586, dated Apr. 15, 2009.
Office Action for U.S. Appl. No. 10/802,586, dated Dec. 13, 2007.
Office Action for U.S. Appl. No. 10/802,586, dated Jun. 4, 2007.
Office Action for U.S. Appl. No. 10/802,586, dated Mar. 18, 2008.
Office Action for U.S. Appl. No. 10/802,586, dated Oct. 15, 2008.
Office Action for U.S. Appl. No. 11/006,917, dated Apr. 26, 2007.
Office Action for U.S. Appl. No. 11/007,098, dated Mar. 31, 2009.
Office Action for U.S. Appl. No. 11/351,373, dated Oct. 13, 2009.
Office Action for U.S. Appl. No. 11/351,373, dated Apr. 21, 2009.
Office Action for U.S. Appl. No. 11/351,373, dated Oct. 8, 2008.
Office Action for U.S. Appl. No. 11/351,373, dated Sep. 8, 2008.
Optimization Guide "Intel® PXA27x Processor Family" (2004).
"Wireless Intel SpeedStep® Power Manager: Optimizing Power Consumption for the Intel® PXA27x Processor Family" (2004).
"Optimization Technology for the Intel® PXA27x Processor Family: Performance and Power Savings for Wireless System and Application Development" (2004).
"Intel® PXA27x Processor Reference Platform: Schematics" (2004).
"Intel® PCA Power Management: Software Design Guide" (2002).
Written Opinion for Application No. PCT/US2004/029083, dated Feb. 7, 2005.

* cited by examiner

PERFORMANCE MONITORING BASED DYNAMIC VOLTAGE AND FREQUENCY SCALING

FIELD OF THE DISCLOSURE

The disclosure generally relates to voltage and frequency scaling in processor applications and, more particularly, to techniques for voltage and frequency scaling that use a performance monitor.

BACKGROUND OF THE RELATED ART

Power dissipation and energy consumption are key parameters in designing embedded systems, such as cellular telephones, personal digital assistants (PDA), and multi-feature smart devices. These parameters are not only important for increasing battery life, they are important for reducing integrated device packaging costs and device cooling costs.

Reduced instruction set computing (RISC) architectures, such as million instructions per second (MIPS) machines and Advanced RISC machines (ARM), enjoy great popularity in the embedded systems market and, as a result, benefit from power and energy consumption management. The Intel XScale™ core architecture, available from Intel Corporation of Santa Clara, Calif., is an example implementation of the ARM architecture. XScale™-based processors are used in the Intel Personal Internet Client Architecture (PCA) processors (e.g., PXA250, PXA261, and PXA262) employed in vast numbers of embedded systems.

Power and energy management in processor architectures can be done at several levels within an embedded system hierarchy, including, the integrated circuit component level, the platform level, the operating system level, the managed runtime environment level, the application level, and the user level. In most systems, power and energy management is performed by the operating system. Some operating systems, for example, use dynamic frequency and voltage scaling techniques.

Frequency scaling is a technique where the processor clock is adjusted by a multiple of the maximum clock frequency or the memory bus frequency. This permits the processor to consume less power, but does so at the expense of reduced performance. Frequency scaled processors can have any number of discrete operating frequency points. For example, the Intel PXA250 processor supports the following operating frequencies in run mode: 99.5 MHz at 0.85V; 118, 132.7, 147.5, 165.9, and 199.1 MHz at 1.0V; 235.9, 265.4, and 294.9 MHz at 1.1V; and 381.9 MHz at 1.3V.

Dynamic voltage scaling reduces the power consumed by a processor by lowering its operating voltage. A reduction in operating voltage also requires a proportional reduction in frequency. Voltage scaling is preferred because the dynamic power consumed by a CMOS processor is directly proportional to the square of the operating voltage: $P(power)=C(capacitance)*V^2 (voltage^2)*f(frequency)$, where C is the average switching capacitance loading of the processor, f is the operating frequency, and V is the supply voltage. Power consumption can be minimized by reducing C, f, or V. Reducing voltage will have a quadratic effect on power. By varying the voltage and the frequency, it is possible to obtain more than a quadratic reduction in power dissipation. Scaling down frequency without scaling voltage is typically not done, however, since the power savings is offset by the increase in execution time, yielding no reduction in the total amount of energy consumed.

The dynamic voltage and frequency scaling techniques executed in operating systems today use interval-based schedulers. Although prevalent, interval-based schedulers have numerous shortcomings.

One shortcoming is that interval-based schedulers merely predict a future workload. They use algorithms based on uniform-length intervals (in the range of 30 to 100 ms) to monitor the processor utilization of a previous interval. That historical data is then used to set the voltage level for the next interval. Although the interval-based scheduling algorithm is simple and easy to implement, it often predicts the future workload incorrectly, especially when an application's workload exhibits large variability, e.g., cycle to cycle variability. Interval-based schedulers are unable to scale the voltage and frequency of the processor at runtime based on actual usage patterns of the executing application.

A second shortcoming is that interval-based schedulers predict usage based on a processor utilization factor unrelated to future workload. And there is no standardization by which that utilization factor can be made to accurately predict future workload.

DETAILED DESCRIPTION OF AN EXAMPLE

Apparatuses and techniques are described that allow dynamic voltage and frequency scaling, for example, using an Intel XScale™ core architecture with a performance monitor. In these examples, voltage and frequency scheduling policy may be optimized using a voltage scheduler component executing in an underlying operating system. The techniques may reduce power dissipation and energy consumption of end user applications implemented either in native code or in managed code such as Java and C#. The techniques may be used in embedded devices, such as portable personal computers, PDAs, cellular telephones, smart phones, and other portable electronic devices. Although the techniques are described with reference to such embedded devices, persons of ordinary skill in the art will appreciate that the techniques may be used in other processor environments, including non-embedded devices. Further still, while the described techniques affect operating voltage and operating frequency, information from a performance monitor may be used to affect other power management variables.

Figure 1:
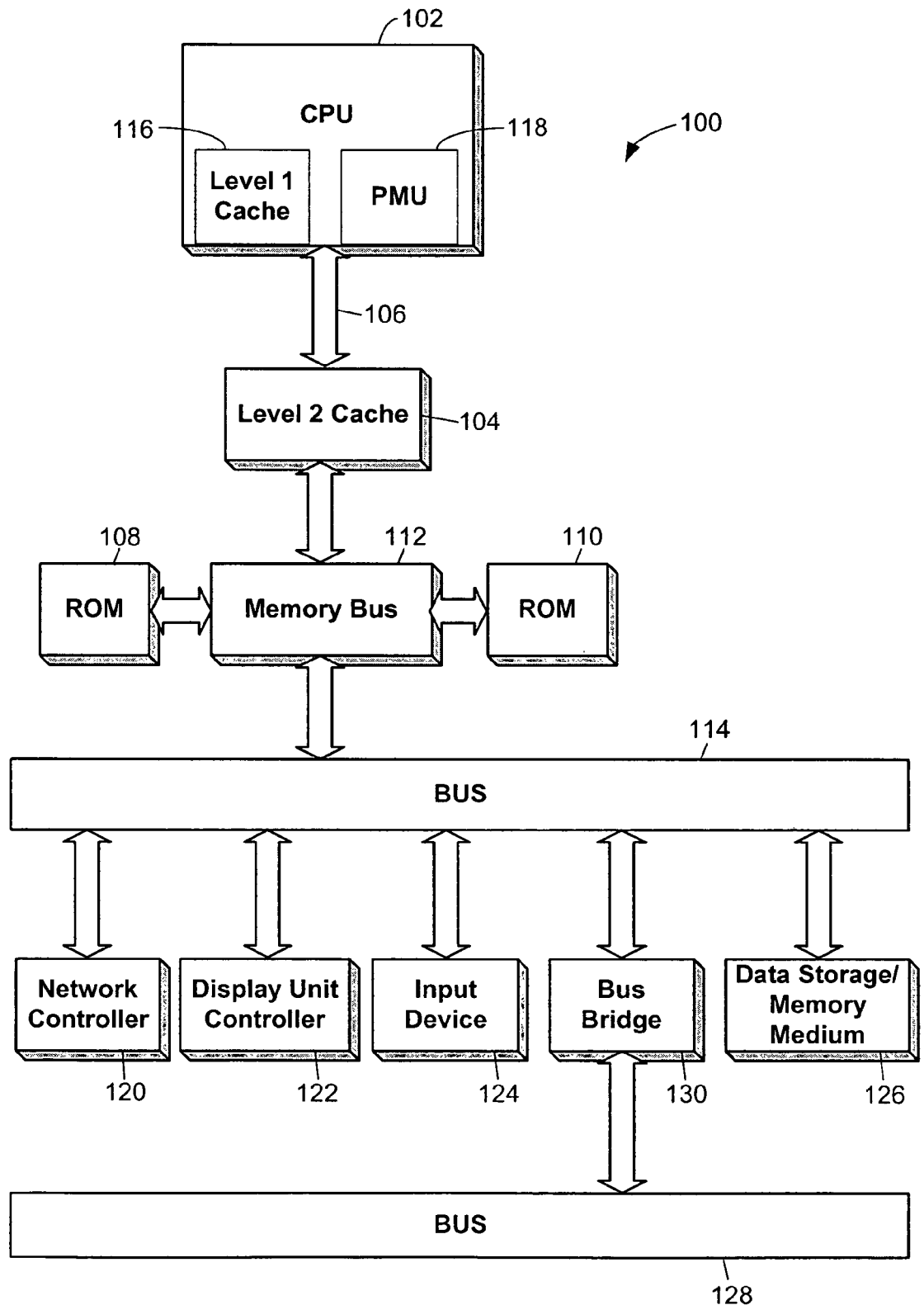
FIG. 1 illustrates a block diagram of a system including a central processing unit (CPU) architecture having a performance monitor unit (PMU).

FIG. 1 illustrates an example computer system 100 that includes a CPU unit 102 coupled to a Level 2 cache 104, via a CPU bus 106. The cache 104 is coupled to a RAM 108 and a read-only memory (ROM) 110, via a memory bus 112. In the illustrated example, the memory bus 112 is coupled to a system bus 114. Alternatively, the memory bus 112 may be a system bus. Persons of ordinary skill in the art will appreciate that the illustrated configuration is by way of example only.

The CPU 102 may include a discrete arithmetic logic unit (ALU), registers, and control unit all connected together. Or, as shown, the CPU 102 may be an integrated microprocessor. The CPU 102 includes a Level 1 cache 116, which may include a data cache, an execution cache, and an instruction cache running at processor speeds.

The CPU 102 also includes a performance monitoring unit (PMU) 118 that may be on the CPU chip, as shown, or coupled thereto. Suitable microprocessors offering on-chip PMUs include Pentium® 4, Itanium®, and XScale™-based processors (all available from Intel Corporation), as well as the PowerPC® line of microprocessors available from IBM Corporation of White Plains, N.Y. The CPU 102 may be any processor or processor architecture (e.g., one with an off-chip PMU) capable of performance monitoring. And, although not shown, persons of ordinary skill in the art will recognize that the CPU architecture 102 may also include a memory management unit, branch target and write buffers, as well as support logic for debugging.

The system bus 114 is coupled to a network controller 120, a display unit controller 122, an input device 124, and a data storage/memory medium 126, e.g., a mass storage device. Examples of the various devices coupled to the bus 114 are known. In the illustrated example, the bus 114 is coupled to another bus 128 via a bus bridge 130.

The operating system operating within the processor architecture 102 may be one of a variety of systems, for example, one of the WINDOWS family of systems available from Microsoft Corporation of Redmond, Wash., such as WINDOWS 95, 98, 2000, ME, XP, or CE. Alternatively, the operating system may be one of the UNIX* family of systems, originally developed by Bell Labs (now Lucent Technologies Inc./Bell Labs Innovations) of Murray Hill, N.J. and available from various sources. As a further alternative, the operating system may be an open-source system, such as the LINUX operating system. It will be recognized that still further alternative operating systems may be used.

Figure 2:
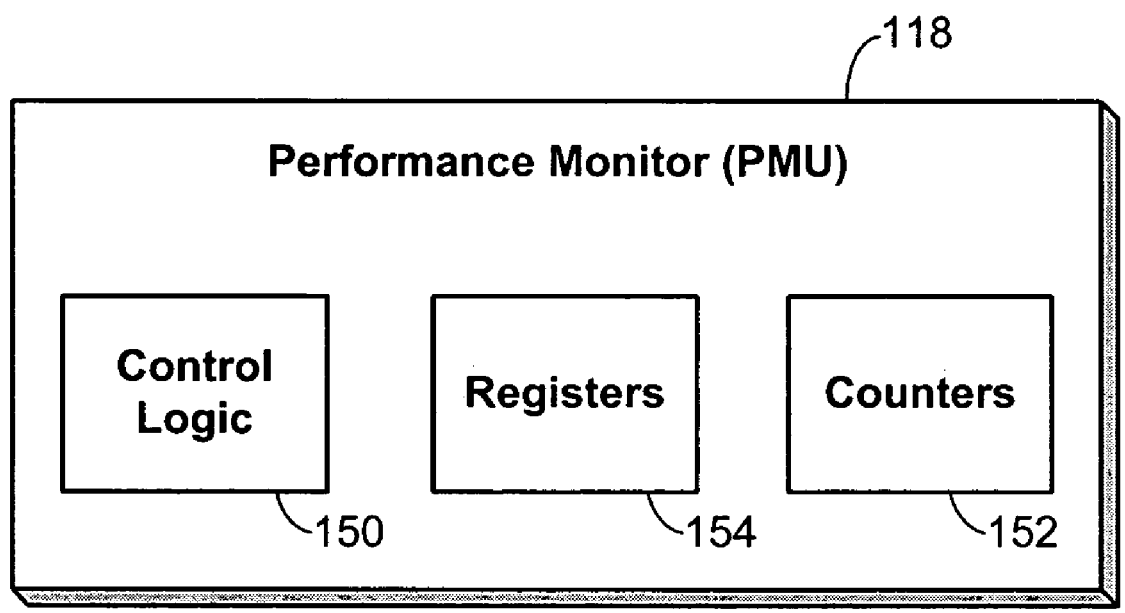
FIG. 2 illustrates the performance monitor unit of FIG. 1 in greater detail.

FIG. 2 illustrates the PMU 118 in greater detail. The PMU 118 includes control logic 150, counters 152, and registers 154. The PMU 118 may be on-chip hardware that monitors discrete performance events during program execution. The counters 152 may include global time stamp counters and dedicated programmable event counters.

The events monitored may be identified by the event registers 154, which control the counters 152 to incrementally monitor desired events, such as runtime performance data indicative of thread level utilization of the CPU 102. Example performance events include instruction cache misses, data cache misses, instructions executed, branches executed, branch mis-predicts, instruction translation look up buffer (TLB) TLB misses, data TLB misses, stalls due to data dependency, data cache write-back, etc. Each register within the registers block 154 may control a number of counters within the counters block 152. By way of example only, 32 bit-counters and 32-bit or 64-bit registers may be used, respectively. Different processor architectures may support simultaneous monitoring of more than one performance event.

Figure 3:
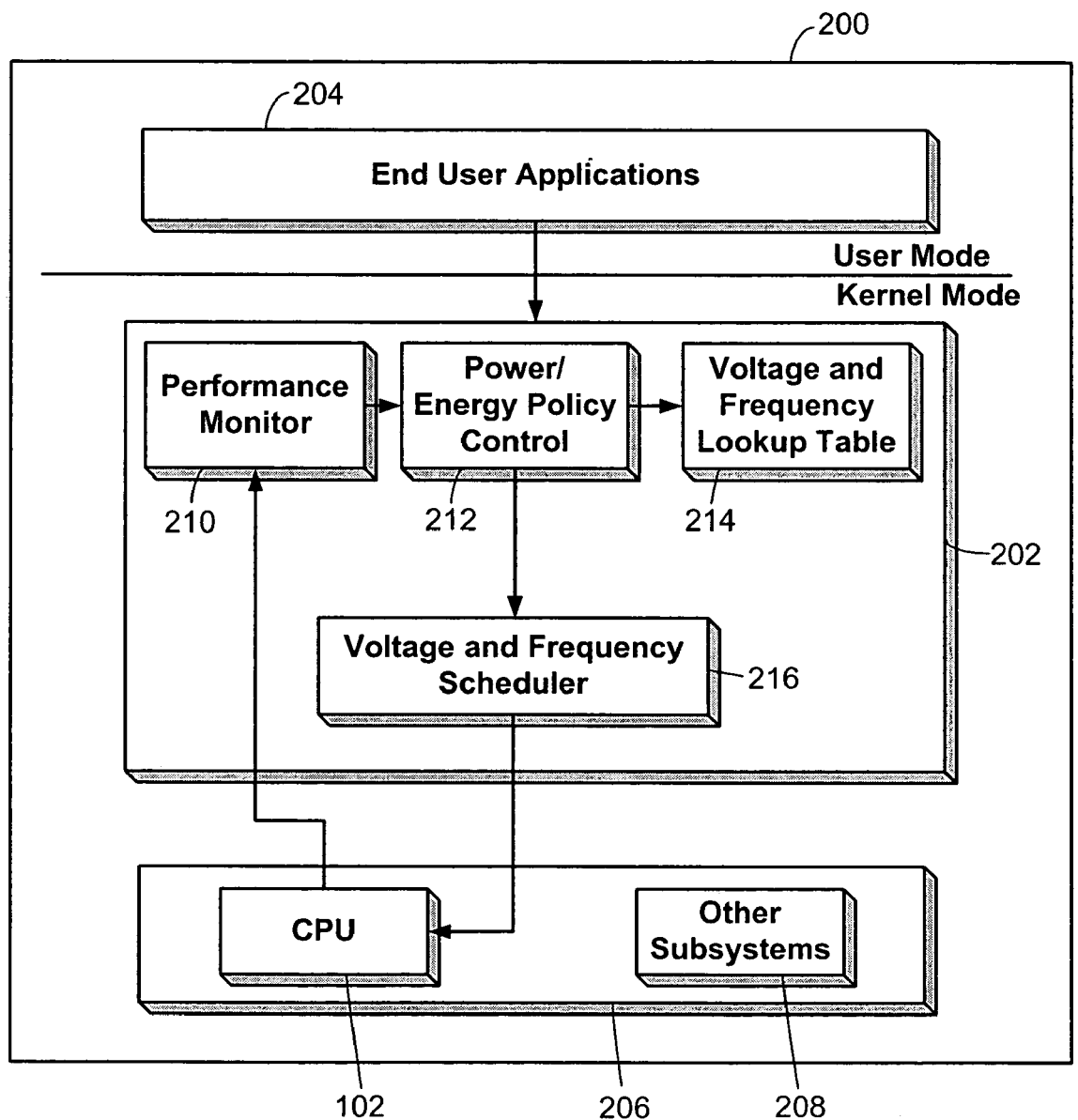
FIG. 3 illustrates a power management architecture that may be implemented on the system of FIG. 1

FIG. 3 shows an example system architecture 200 of a dynamic voltage and frequency scaling system. The system 200 includes a user mode and a kernel mode that runs an operating system environment 202. The operating system 202 of the embedded platform serves as a software interface between end-user applications 204 and platform hardware 206. For example, the end-user applications 204 communicate with an abstraction of the platform hardware 206 provided by the operating system 202. All application programs run in the user mode, while the operating system components run in the kernel mode of the underlying processor.

The architecture 200 can be used to reduce the power dissipation and energy consumption of the underlying processor subsystem via dynamic voltage and frequency scaling. This can prolong the battery life of an embedded device. The load of the CPU 102 will change over time, depending on the application types and user interactions with the application. That is, the power dissipation and energy consumptions of the CPU 102 depend on the type and the number of instructions executed by the application program. The power and energy consumptions also depend on the memory reference patterns of the executing applications. By observing the number of instructions executed and the total number of memory references of the application at runtime, or other performance events, the architecture 200 can effectively adjust power management within the system 100, for example, via adjusting operating voltage and operating frequency.

The platform hardware 206 includes the CPU 102 which is capable of supporting dynamic clock frequency and voltage scaling. Example processors having dynamic clock frequency and voltage scaling capabilities are listed above. These processors are capable of operating at different frequencies and at different supply voltages, for example, via a programmable voltage regulator that supplies appropriate voltage to the processor at different operating frequencies.

As would be understood by persons of ordinary skill in the art, the platform hardware 206 may include additional subsystems and these have been collectively labeled 208 in FIG. 3.

The operating system 202 includes a performance monitor component 210 coupled to the CPU 102 directly or indirectly and is able to capture performance monitored events and current processor frequency. The monitor 118 is a hardware component that is part of the processor 102, and the monitor 210 is a software component that makes use of the monitor 118 to get performance event data. The monitor 210 can directly interact with the monitor 118 or it can interact with monitor 118 through some intermediary software driver component. The monitor 118 provides the hardware mechanism to gather performance event data, while the monitor 210 presents code to gather the performance events. The performance monitor 210 observes the usage patterns of the executing application at its thread level at runtime. In other words, the performance monitor 210 collects execution characteristics or usage patterns of every application thread running on the system. For Intel XScale™ architecture for example, a set of execution characteristics can be obtained by using the PMU of the Intel XScale™ core, which provides two 32-bit performance counters that allow two performance events to be monitored simultaneously. Additional counters may be used to monitor more than two simultaneous events. The Intel XScale™ core also has a 32-bit clock counter which can be used in conjunction with the performance counters to measure the cycle count for the executing application. The current Intel XScale™ core provides 14 different performance events that can be monitored. These include events such as those highlighted above.

Several execution characteristics of an application thread can be gathered using the performance monitor 210. Since the Intel XScale™ core supports monitoring only two events at a time, instruction counts and memory references may be monitored for thread-level utilization in that processor architecture. Other characteristics may be used, however, and the characteristics used may depend on the processor employed. Additionally, the performance monitor may monitor multiple application threads simultaneously.

With instruction counts and memory references, along with the cycle counts for the application, the performance monitor 210 may calculate two metrics: instructions per clock cycle and memory references per clock cycle for the application thread. The instructions per clock cycle metric indicates the sensitivity for performance loss due to reduction in operating frequency, while the memory reference per clock cycle metric indicates the degree of memory use by the application. These two metrics may be calculated from the performance events measured by the PMU, described by example above. These two metrics are examples only, however. It is possible to create additional metrics based on other performance events data.

The performance monitor 210 may also observe the current operating frequency of the processor at the application thread level. The performance monitor 210 provides both thread level execution characteristic metrics and the current processor clock frequency information to a power/energy policy controller 212 at runtime. And, the power/energy policy controller 212 determines the desired operating voltage and operating frequency. The operating system 202 may configure a default power/energy policy, having a pre-determined fixed voltage and clock frequency for the platform for each application thread. During an application run, this default policy may be optimized based on observation data, such as the two thread-level characteristic metrics.

The power/energy policy controller 212 may access a voltage and frequency lookup table 214, for example, and compare the thread-level characteristic metrics (or metrics derived therefrom) to the values stored in the lookup table 214. The table 214 may be constructed by empirical analysis of appropriate processor workloads or micro-benchmarking programs to create different instructions per clock and memory references per clock metrics. The table 214 may provide a range of optimal processor clock frequencies and an optimal minimum voltage for each instructions-per-clock cycle metric and each memory-references-per-clock cycle metric to conserve power and energy with minimal impact on the application performance. Depending on the characteristic metrics of the application thread, the power/energy policy controller 212 may use the lookup table 214 to select the appropriate clock frequency and voltage for the subsequent thread execution. The table 214 may include multiple operating frequencies for a particular operating voltage. The power/energy policy controller 212 may select among these operating frequencies based on the current operating frequency, for example. The power/energy policy controller 212 may determine a new operating frequency, a new operating voltage, or both.

Once a decision has been made regarding the operating clock frequency and the operating voltage, the decision information is passed to a voltage and frequency scheduler 216 that adjusts the processor frequency and corresponding supply voltage on the fly prior to executing the application thread. Techniques for changing processor frequency and voltage supply are known. On an Intel XScale™-based processor, for example, changing the clock frequency is achieved by writing appropriate multiplier values into a configuration register in the CPU architecture. A programmable voltage regulator may be used to scale the voltage.

EXAMPLE IMPLEMENTATION

Figure 4:
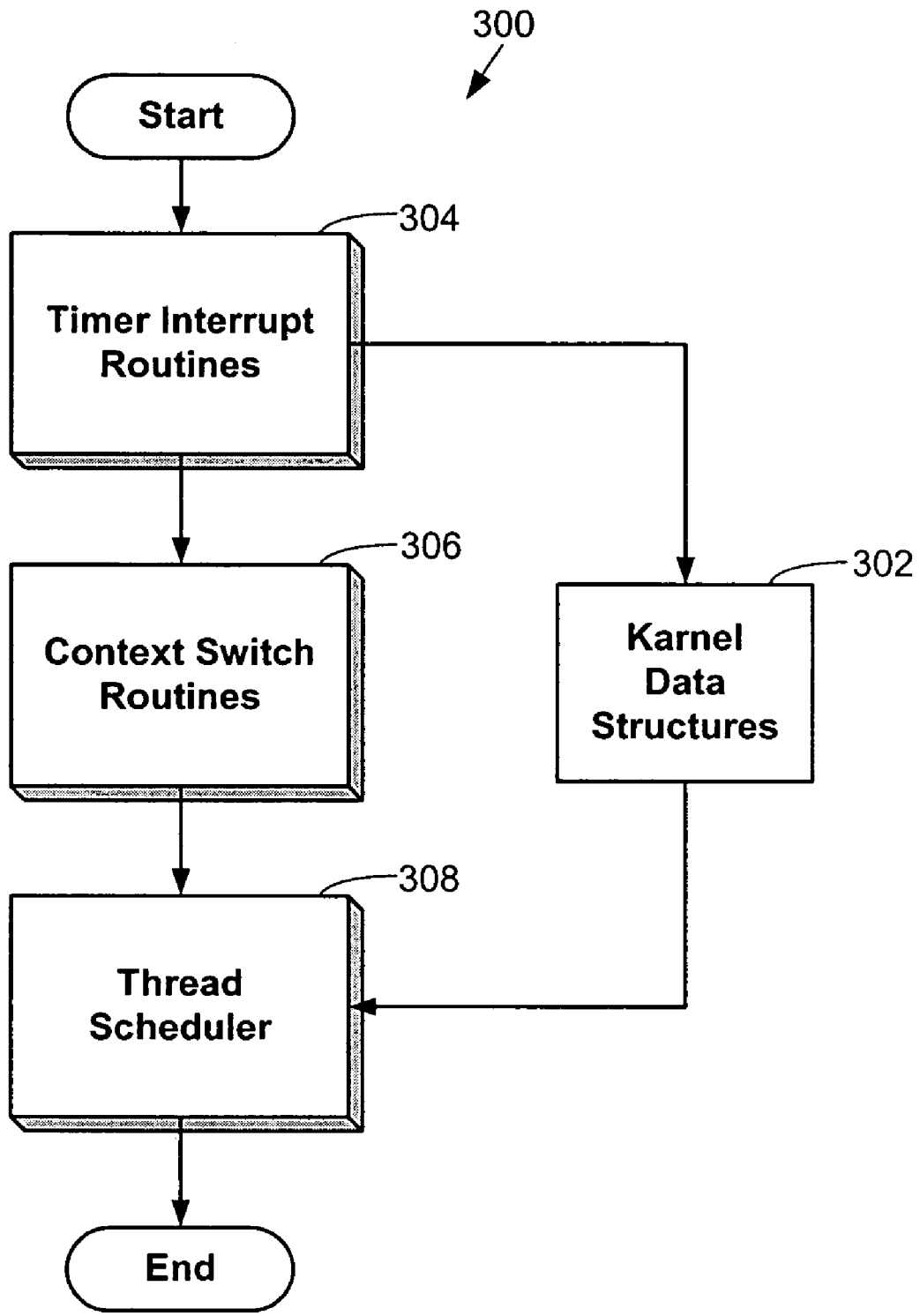
FIG. 4 illustrates an example implementation of the power management architecture for an example operating system.

The blocks 210-216 may be implemented as part of one or more operating system components. An example implementation is shown in FIG. 4 and may correspond to an example UNIX operating system implementation.

In the process 300, the architecture 200 is implemented via existing operating system kernel data structures 302, thread timer interrupt routine 304, context switch routine 306, and a thread scheduler component 308. The voltage and frequency lookup table 214 may be a part of the kernel data structures 302.

The timer interrupt routine 304 gathers or derives instruction counts and memory references (i.e., based on PMU monitored events) and cycle counts, and stores them in the kernel data structures 302. The context switch routine 306 also maintains these two-thread level PMU values, cycle counts, and the current operating frequency at the thread level. The thread scheduler 308 calculates the thread characteristics metrics (i.e., instructions per cycle and memory references per cycle), determining the desired operating frequency and operating voltage levels for the given thread characteristics metrics via the frequency and voltage lookup tables. The scheduler 308 also performs the dynamic voltage and frequency scaling. Depending on the operating systems, the techniques may be implemented either as a stand-alone module or component of the operating system or as an extension to the existing kernel modules or components.

Although some of the techniques are described in the context of the Intel XScale™ architecture, the voltage and frequency scaling architecture are applicable to other architectures, such as the IA32 architectures, also available from Intel Corporation. The differences are mainly in the performance monitoring capabilities of the processor and in the voltage and frequency lookup tables for different processor architectures. Furthermore, the techniques described can be extended to include additional thread-level utilization metrics, e.g., with processor architectures capable of monitoring more than two performance events simultaneously.

Although certain apparatus and techniques constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What I claim is:

1. An article comprising a machine-accessible medium having stored thereon instructions that, when executed by a machine, cause the machine to:
   obtain from a performance monitor runtime performance data of a thread level utilization of the machine by an application during an execution of the application on the machine, wherein the runtime performance data is indicative of a set of execution characteristics of a thread of the application, including an instructions-per-clock cycle metric and a memory references-per-clock cycle metric, wherein the runtime performance data includes instruction counts, memory references, and cycle counts obtained from a timer interrupt in the performance monitor; and
   based on the instructions-per-clock cycle metric and the memory references-per-clock cycle metric, reduce power dissipation of the machine by adjusting an operating voltage or an operating frequency of the machine during the execution of the application, wherein the operating voltage and operating frequency are nonzero.

2. The article of claim 1, wherein the performance monitor is a Performance Monitoring Unit (PMU) and is part of a central processing unit (CPU) within the machine.

3. The article of claim 2, wherein the runtime performance data includes at least one from the group consisting of instruction cache misses, data cache misses, instructions executed, branches executed, branch mis-predicts, instruction translation look-up buffer TLB misses, data translation look-up buffer TLB misses, stalls due to data dependency, and data cache write-backs.

4. The article of claim 3, wherein the PMU includes a plurality of counters for simultaneously measuring multiple different performance data.

5. The article of claim 1, having further instructions that, when executed by the machine, cause the machine to:
in response to the runtime performance data, determine if the operating voltage and operating frequency should be adjusted upward or scaled down.

6. The article of claim 5, having further instructions that, when executed by the machine, cause the machine to:
compare the runtime performance data to a voltage and frequency scheduler lookup table that stores at least one voltage value and at least one frequency value.

7. The article of claim 1, having further instructions that, when executed by the machine, cause the machine to:
simultaneously obtain a plurality of runtime performance data; and
in response to the plurality of runtime performance data, adjust the operating voltage and the operating frequency.

8. The article of claim 1, having further instructions that, when executed by the machine, cause the machine to:
operate the performance monitor in an operating system environment in communication with a platform hardware environment, in a kernel mode, and in communication with an end user code, in a user mode.

9. The article of claim 1, wherein the instructions, when executed by the machine, cause the machine to adjust the operating voltage and the operating frequency.

10. A method comprising:
obtaining, from a performance monitor, runtime performance data of a thread level utilization of a machine by an application during an execution of the application on the machine, wherein the runtime performance data is indicative of a set of execution characteristics of a thread of the application, including an instructions-per-clock cycle metric and a memory references-per-clock cycle metric for a central processing unit (CPU) having an operating voltage and an operating frequency; and
reducing power dissipation of the CPU by adjusting the operating voltage or the operating frequency during the execution of the application in response to the instructions-per-clock cycle metric and the memory references-per-clock cycle metric, wherein the operating voltage and operating frequency are nonzero.

11. The method of claim 10, further comprising:
adjusting both the operating voltage and the operating frequency.

12. The method of claim 11, further comprising adjusting the operating voltage and the operating frequency upward.

13. The method of claim 11, further comprising adjusting the operating voltage and the operating frequency downward.

14. The method of claim 10, wherein the performance monitor is a Performance Monitoring Unit (PMU).

15. The method of claim 10, wherein the runtime performance data includes at least one from the group consisting of instruction cache misses, data cache misses, instructions executed, branches executed, branch mis-predicts, instruction translation look-up buffer misses, data translation look-up buffer misses, stalls due to data dependency, and data cache write-backs.

16. The method of claim 10, further comprising comparing the runtime performance data to a voltage and frequency scheduler lookup table that includes at least one voltage value and at least one frequency value.

17. The method of claim 16, further comprising:
benchmarking the CPU;
determining the at least one voltage value and the at least one frequency value in response to the benchmarking; and
creating a lookup table of the at least one voltage value and the at least one frequency value.

18. A method for adjusting operating voltage and/or operating frequency on a machine having a processor, the method comprising:
the machine simultaneously monitoring multiple performance events, where each performance event reflects a different thread level utilization of the processor by at least one application during an execution of the at least one application on the processor;
based on the simultaneously monitored multiple performance events, obtaining multiple performance metrics indicating events per clock cycle of a thread of the at least one application, the multiple performance metrics including an instructions-per-clock cycle metric and a memory references-per-clock cycle metric; and
based on at least the instructions-per-clock cycle metric and the memory references-per-clock cycle metric, reducing power dissipation of the machine by adjusting an operating voltage or an operating frequency of the machine during the execution of the at least one application.

19. The method of claim 18, wherein the performance events are instruction counts and memory references that are simultaneously monitored.

20. The method of claim 18, further comprising the machine simultaneously monitoring multiple performance events from different applications executing on the processor.

21. The method of claim 18, further comprising simultaneously monitoring the multiple performance events using a different counter dedicated to monitor for each performance event.

* * * * *